Sept. 1, 1964  H. E. GRENOBLE  3,147,157
FABRICATION OF MAGNETIC MATERIAL
Filed Aug. 5, 1959
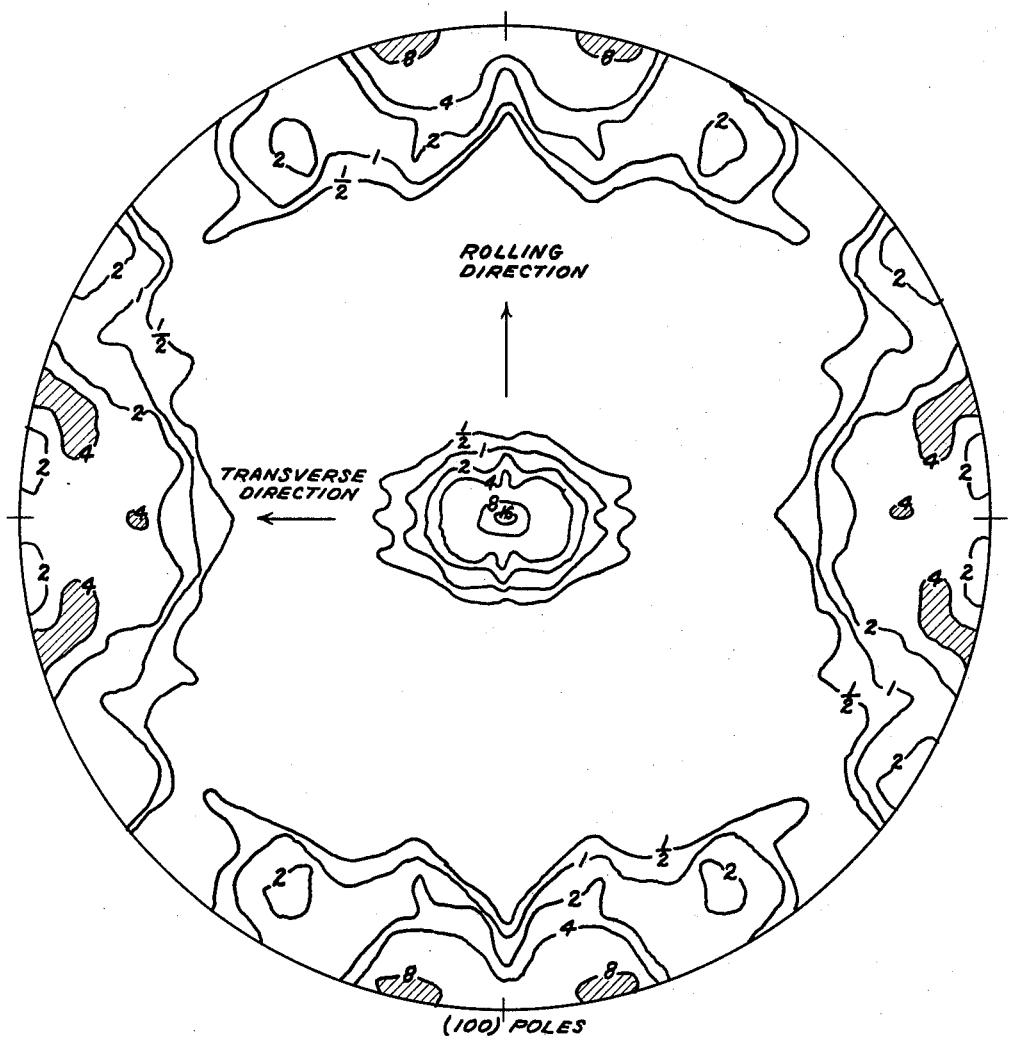
Inventor:
Herbert E. Grenoble,
by Richard A. Speer
His Attorney.

United States Patent Office 3,147,157
Patented Sept. 1, 1964

3,147,157
FABRICATION OF MAGNETIC MATERIAL
Herbert E. Grenoble, Amsterdam, N.Y., assignor to General Electric Company, a corporation of New York
Filed Aug. 5, 1959, Ser. No. 831,792
15 Claims. (Cl. 148—111)

This invention relates to magnetically "soft," polycrystalline, body-centered cubic alloys and, more particularly, to the fabrication of an iron-silicon alloy into polycrystalline sheet material characterized by a "cube texture'" grain orientation.

This application is a continuation-in-part of applicant's copending applications, Serial No. 737,486, filed May 26, 1958, and now abandoned, and Serial No. 737,488, filed May, 26, 1958, and now abandoned, both assigned to the same assignee as the present invention.

Magnetic materials in the form of laminations or sheets are widely used in metal cores and the like for saturable core devices, motors, generators and other electromagnetic apparatus in which substantial qualities of magnetic flux must be linked with electrical conductors.

An alloy of iron and silicon containing from about 2 percent to 6 percent silicon, and preferably from about 3 percent to 5 percent, is most desirable. Depending upon how the alloy is fabricated, it may exhibit relatively high permeability at high flux density and relatively low hysteresis and other power loss characteristics.

For certain purposes, a strong preferred grain orientation is desirable in sheet and strip material formed by rolling or forging. This preferred grain orientation has been previously produced in silicon steel, for example, by hot and cold rolling silicon steel ingots into sheets or strips combined with appropriate heat treatment, as is well known in the art. The finished product is a polycrystalline material which has the body-centered cubic lattice form, and in which a majority of the grains have substantially the same orientation with respect to the plane of the sheet or strip and the direction of rolling. This orientation may be described as one in which the unit cube lattices of the oriented grains have a plane containing diagonally-opposite cube edges substantially parallel to the plane of the sheet and a pair of opposite cube faces substantially perpendicular to the rolling direction and to the plane of the sheet. This orientation is conventionally referred to as "cube-on-edge" and defined and described by metallurgists and crystallographers as the (110)[001] orientation in terms of the Miller Crystallographic Index System, a complete discussion of which may be found, for example, in "Structure of Metals," C. S. Barrett, 2nd Edition, 1952, the Macmillan Company, pages 1 to 25. A method for producing the cube-on-edge type orientation is disclosed in U.S. Patent 2,112,084, granted to Albert A. Frey and Francis Bitter.

The aforementioned preferred orientation improves the useful magnetic properties of these materials in the plane of the sheet and in the rolling direction, but the magnetic properties in the plane of the sheet and transverse to the rolling direction are comparatively poor. This magnetic anisotropy has its disadvantages in laminated cores so constructed that the direction of the magnetic flux occurs in the transverse direction for some part of the total path distance. The unfavorable orientation in the transverse direction then results in a loss of efficiency.

In copending application Serial No. 610,909 of Hibbard and Walter, filed September 20, 1956, assigned to the same assignee as the present invention, it was found that the aforementioned disadvantages could be overcome by producing an entirely preferred orientation having good properties in directions both transverse and longitudinal to the direction of rolling.

This orientation may be described as one in which a majority of the grains have their body-centered cubic lattices oriented so that four of the cube faces are substantially parallel to the rolling direction, two of these faces being also substantially parallel with the plane of the sheet and the other two being substantially perpendicular to the plane of the sheet, and the remaining two cube faces substantially perpendicular to both the rolling direction and the plane of the sheet. This orientation may be conveniently termed "cube texture" or defined in terms of Miller Indices, (100)[001]. These sheet and strip materials having this orientation have been found to have magnetic properties which are equivalent to those of previously known cube-on-edge or (110) [001] materials of the same composition in the rolling direction and in the plane of the sheet, and much more desirable magnetic properties in the plane of the sheet transverse to the rolling direction than the previously known materials.

As disclosed in the aforementioned copending application, this preferred orientation, i.e., "cube texture," may be produced by particularly preparing cast ingots having an entirely or substantially entirely columnar as-cast grain structure. These castings are produced so that substantially all of the metal therein is comprised of elongated columnar grains, the longitudinal axis of each of which is substantially parallel to every other longitudinal grain axis and all of which axes are substantially parallel to a single direction in the ingot.

It was found that by appropriately hot, warm and cold rolling as-cast slabs of up to about one inch in thickness or slabs of that thickness cut from larger ingots, with particular reference to the direction of the longitudinal axes of the columnar grains to the rolling directions and rolling planes that the cold rolled structure of the sheet material so produced could be caused to recrystallize upon appropriate annealing to produce sheet or strip material having the desired cube texture. More specifically, this reduction procedure involved heating such slabs to a temperature range of from about 700° C. to about 1100° C., reducing the thickness of the so-heated slabs about 90 to 97 percent in a plurality of rolling passes without reheating, annealing, cold reducing the annealed material at least 40 percent in thickness by cold rolling and annealing to effect recrystallization of the cold rolled grain structure to produce the cube textured sheet or strip material.

The casting, rolling and heat treatment procedure just outlined was found to be effective in producing cube texture in polycrystalline body-centered cubic sheet or strip materials composed of at least 92 percent iron and, more specifically, alloys containing up to about 5 percent or 6 percent silicon, up to about 5 percent molybdenum and up to about 8 percent aluminum—all useful soft magnetic materials.

However, the aforementioned process is dependent upon obtaining a particular structure and grain orientation in the ingot from which the sheet or strip is formed and depends, further, upon rolling in a particular direction. These requirements present a commercial disadvantage owing to the cost of preparing an oriented ingot and the limitation in ingot size which this imposes.

It is desirable to produce sheet or strip of cube texture from an ingot made in a conventional manner without particular regard to grain size, shape or orientation. Since the existing process required a starting ingot of columnar grain structure, it is clear that a limitation is present in the process which constitutes a commercial disadvantage, due to costliness and limitation in ingot size. It would be desirable to be able to produce cube texture orientation from ingots characterized by randomly oriented grains, as well as from ingots having a columnar grain structure.

It is therefore a principal object of this invention to provide a process for producing a cube textured sheet product from conventionally cast iron-silicon ingots having generally random crystal orientation.

Another object of this invention is to provide an improved process for producing cube textured sheet product having good magnetic properties both transverse to and along the path of rolling from cast silicon-iron ingots having a columnar grain structure.

Other objects and advantages of the present invention will be in part obvious and in part explained by reference to the accompanying specification and drawings.

In the drawings, FIG. 1 is an X-ray pole diagram showing the distribution of the 100 poles in material processed according to the present invention to the stage of annealed, hot rolled band.

Briefly stated, the present process is one by which ingots without a particular grain orientation can be converted into finished wrought sheet metal product having a strong cube texture and good magnetic quality in both the rolling direction and transverse-to-rolling direction substantially equivalent to that of wrought metal product produced from ingots with columnar oriented grains as described in aforementioned application Serial No. 610,909. The results of the invention can be achieved by controlling in combination a group of processing variables which cooperate to effect the desired result.

The amount of cube texture present in the processed sheet is determined by the conventional torque magnetometer test described in copending application Serial No. 610,909 aforementioned. The purpose of this test is to measure the magnetocrystalline anisotropy characteristics of the magnetic material. In this test, a disc-like specimen is supported in an unidirectional magnetic field with the axis of the disc perpendicular to the direction of the field. As is well known, the optimum magnetic properties are in the [100] direction. Assuming this direction is in the direction of rolling, the torque measurement in this direction taken parallel to the direction of the field will be zero. If the material has a strong cube texture, then the torque measurement transverse to the direction of rolling will also be zero. By rotating the disc in the field, the variation in amount of torque necessary to rotate the disc about its axis can be determined.

The torque value obtained for each amount of disc rotation is plotted against angular rotation, which values for a single crystal generate a sine curve having uniform peak values above and below the abscissa at 45° intervals. Since the peaks obtained for a single crystal are all equal in magnitude, the so-called "peak ratio" between adjacent peaks (i.e., at 90° intervals) is equal to one, indicating a perfect cubic orientation or texture. A polycrystalline material of strong cube texture yields a similar sine curve, but because the polycrystalline material is not as perfect as a single crystal, the peak ratios may not equal one. The higher the peak torque values and the nearer to unity the ratio of the peak torques corresponding to the rolling and transverse directions, the better is the cube texture. A peak torque value has been obtained for a single crystal in the form of a one-inch diameter disc 0.012 inch thick of the order of about 130,000 ergs per cc. in a unidirectional field of 1000 oersteds. Similar properties obtained on polycrystalline material produced by the invention have indicated average peak torque values as high as 111,000 ergs per cc. and peak ratios of the order of about 0.96.

One aspect of the invention resides in controlling certain variables at the early part of the fabrication process so that an intermediate sheet metal product is delivered to the finishing operation in a condition which will favor the formation of cube texture. In the latter part of the fabrication procedure, a combination warm rolling and intermediate recrystallization heat treat cycle is utilized to assure optimum yield in the desired properties.

The important variables at the start of the process are chemical composition of the cast metal body, temperature of rolling, the amount of reduction during hot rolling to an intermediate sheet metal product (referred to hereinafter as a hot rolled band) and a high temperature anneal of the hot rolled band to prepare it for the final stage of fabrication.

Compositions of soft magnetic materials which crystallize in the body-centered cubic lattice form at room temperature, such as iron and alloys of iron containing small amounts of silicon, aluminum or molybdenum as the principal alloying elements, with the remainder at least about 92 percent iron, are all found to respond to the practice of this invention. Examples of such alloys are those containing up to about 6 percent silicon (e.g., 2 to 6 percent), up to about 8 percent aluminum, up to about 5 percent molybdenum, and the remainder essentially iron.

The carbon content in the starting material may range by weight from about 0.02 to 0.1 percent, the amount of carbon needed being dependent upon the amount of silicon present in the alloy. For example, in an alloy containing about 3 percent silicon, carbon percentages of from about 0.04 to 0.07 are preferred.

The most used metals are substantially binary alloys of iron and silicon, the silicon ranging from about 2 percent to 6 percent by weight and preferably between about 2.5 percent and 5 percent, the remainder being substantially all iron. A composition of 2.7 percent to about 4.0 percent silicon is particularly advantageous, together with the preferred carbon range, in carrying out the hot working of the alloy. Generally, the impurities should be kept as low as is practicable, with elements such as sulfur, oxygen, nitrogen and manganese being present in small amounts up to a total not exceeding about 0.2 percent. Sulfur and manganese are usually present in amounts of from 0.01 to 0.02 and 0.04 to 0.06, respectively.

The composition is an important consideration both at the start and at the finish of the fabrication. Insofar as hot working is concerned, the composition of the material, with respect to its carbon content taken together with the temperature of hot working, is controlled so that hot rolling is conducted while the material is constituted in part of the austenitic or gamma phase, e.g., at least 5 percent by volume. Also, decarburization of the surface during hot fabrication must be limited to the minimum practicable amount in order to insure that a strong cube texture is developed in subsequent processing.

Control of the amount and distribution of the austenitic phase during hot rolling results in a hot rolled structure which at room temperature is characterized by small equiaxed ferrite grains with stringers of pearlite. This structure has no strong texture and is characterized as nearly random. However, during subsequent heat treatment of the hot rolled band a recrystallization and growth to large grains in the cube-on-face position occurs. These grains have (100) directions which tend to correspond to the rolling direction. At this stage of the processing, the annealed product is warm rolled through at least one reduction stage with an intermediate recrystallization heat treatment between stages when more than one stage is employed to arrive at the desired thickness. The resulting sheet is then annealed under substantially nonoxidizing conditions to recrystallize and develop cube texture. A reduction stage may comprise one or more passes.

Broadly, the carbon-containing iron-silicon alloy is heated to within the temperature range of about 1000 to 1300° C., preferably from about 1000 to 1150° C., for hot working. During the working, the temperature is maintained above 900° C. during the major portion of the reduction to a hot rolled band of from 0.05 to 0.25 inch in thickness. Nominal thickness is generally on the order of 0.10 inch.

By properly heating and rolling, the structure of the hot rolled band is such that a cube texture develops during a subsequent decarburization and annealing heat treatment in pure hydrogen or other inert atmosphere. In this heat treatment, grains having a cube plane corresponding to the plane of rolling, and having cube edge directions corresponding to the rolling and transverse directions, grow preferentially from a background of small grains of nearly random orientation.

A further requirement of the practice of hot rolling is that decarburization of the surface be restricted sufficiently that loss of the two-phase structure (austenite and ferrite) and the consequent growth of large ferrite grains during rolling do not occur. The consequence of decarburization and attendant grain growth in a decarburized surface zone is a poorer selection of grains in the grain-coarsening phase of the band anneal, and a poorer texture at all subsequent stages of processing.

For example, an ingot 19 inches thick was hot rolled following the previously outline practices to a hot rolled intermediate product of 0.15 inch thickness. Both rolled surfaces of the strip were decarburized to a nominal depth of 0.003 inch with ferrite grains extending the full depth of this zone. Two specimens were taken from the rolled strip and surface ground to the usual hot band thickness (0.10 inch), in one case removing material from both surfaces equally, and in the second, removing material from only one side so as to retain the decarburized layer on one side. These specimens, after decarburizing, annealing and warm rolling in two stages to 0.012 inch thickness, yielded the torque values given in Table I following:

TABLE I

| | Peak Ratio | Maximum Torque (Ergs/cc.) |
|---|---|---|
| 1. Interior specimen—ground equally on both surfaces | .85 | 97,000 |
| 2. Surface specimen—ground on one side only | .87 | 71,000 |

It is clearly evident from the results that the presence of a decarburized surface on one side of the hot rolled product is seriously detrimental to the development of cube texture. When the decarburized zone is present on both surfaces, the effect is equally or more detrimental.

To further indicate the effect of decarburization, a hot rolled band of about 0.285 inch thickness, made from a randomly oriented starting material, which had a decarburized surface layer was ground to remove the decarburized layer. The removal of the decarburized layer reduced the thickness of the hot rolled band to about 0.265. A section of this band was then heated in a neutral environment, in this case molten barium chloride, and rolled to 0.100 inch in one pass. The neutral atmosphere and single reduction prevented any additional decarburization from occurring, so that when the band was ultimately reduced to 0.013 inch thickness by cold rolling, a good cube textured sheet was obtained.

A second part of the 0.265 inch band was heated in the same neutral environment but this time was rolled in several passes to 0.100 inch with reheating after each pass. The plurality of reheating stages caused surface decarburization to occur and poor cube texture was developed in the 0.013 inch thick strip produced from this band.

The amount of cube texture obtained in the preceding bodies is indicated by the maximum torque and peak ratio values listed in the following Table II:

TABLE II

| Processing | Decarburization | Peak Ratio at 0.013" | Max. Torque (Ergs/cc.) at 0.013" |
|---|---|---|---|
| Hot rolled to 0.285"—ground to 0.100". | No | 0.90 | 100,000 |
| Ground from 0.285" to 0.265" and rolled to 0.100" in one pass. | No | 0.92 | 96,000 |
| Ground from 0.285" to 0.265" and rolled to 0.100" in 4 passes with intermediate heating. | Yes | 0.92 | 84,000 |

From the preceding results, it is apparent that control of the decarburization is required to obtain optimum crystal orientation. Such control may be obtained in any one of several ways, for example, the material can be heated in a neutral or slightly carburizing atmosphere or it may be rolled without reheating between reduction stages.

To illustrate the effect of using a slightly carburizing atmosphere, a three-inch slab from a standard mill ingot was heated in an atmosphere consisting of about 20 percent methane and 80 percent hydrogen. This atmosphere was designed to prevent surface decarburization from occurring and, in fact, resulted in slight carburizing of the surface. The band was rolled to 0.100 inch in six passes with no intermediate heating steps. This band, after processing to 0.013 inch thickness, had a peak ratio of 0.85 and a maximum torque (ergs/cc.) of 100,000 when measured in a field of 1000 oersteds. This indicates the presence of good cube texture. Thus, the importance of maintaining a uniform carbon content and a relatively high carbon content throughout the hot rolling process with no surface decarburization is clearly shown.

Upon completion of hot rolling, the band is decarburized at temperatures of from 600° C. to 900° C. and preferably 800° C. to 900° C., to within the composition range of from about 0.01 to 0.02 weight percent carbon. Various media may be used to decarburize, the objective being to selectively remove carbon without undue oxidation of the steel. Nitrogen, containing sufficient water vapor to have a dew point of about +70° F., may be used satisfactorily at a temperature of about 800° C. Various partially combusted, mildly oxidizing atmospheres may be used in similar manner. One may also utilize the reaction of the carbon in the steel with an oxide coating on the surface, such as the light oxide usually present upon completion of hot rolling. This is particularly suitable for a process where the band is heat treated as a coil. Molten salts such as barium chloride, containing small amounts of an oxidizing agent such as barium oxide, will cause a rapid removal of carbon. Wet hydrogen is not suitable for decarburizing silicon-iron of this thickness and composition owing to the formation of an impervious silica oxide scale which greatly retards the rate of carbon removal.

In order to develop the cube texture, the hot rolled band, following decarburization, is given a high temperature anneal at temperatures ranging from 1000 to 1350° C. and preferably from 1200° C. to 1300° C. This is preferably done in dry hydrogen although other inert atmospheres, such as high purity argon, are probably satisfactory. Upon heating to slightly above 1050° C., for example, grains in the cube-on-face orientation grow selectively from a background of small, randomly oriented grains. If the specimen is heated to within the range of from 1000° to 1050° C., the small equiaxed grain structure is generally retained. However, upon subsequent warm rolling, according to the present specification, a cube orientation is obtained which has slightly poorer transverse properties than those of a specimen heated to a higher annealing temperature. Growth appears to initiate in well-oriented surface grains which extend their boundaries laterally by the absorption of neighboring grains until they become many times larger than the grains in the stable background. The presence of a distributed manganese sulfide phase probably contributes to development of cube texture by restricting normal grain growth during the anneal. Growth also occurs in the direction of the thickness of the band until the entire thickness is consumed. Ultimately, these grains reach a size of about ¼ inch to 1 inch in diameter and the hot rolled band has a well-defined cube texture (FIG. 1).

The development of a cube-on-face grain structure occurs slowly in the lower temperature range of 1050 to 1100° C. and becomes more rapid at temperatures above 1100° C. so that within two hours at about 1100° C., the entire specimen is consumed. With further heating to about 1300° C., grain boundaries are shortened and straightened with elimination of smaller grains and removal of sulfur. Within two hours at 1300° C., the sulfur content of a hot rolled band, 0.1 inch thick, may be lowered from an initial value of about 0.02 percent to about 0.005 percent. This is desirable to obtain an optimum quality, however the removal of sulfur at this stage of processing is not essential to obtaining a cube texture.

Torque results obtained from samples processed through the hot band stage showed that good cube texture had been obtained. The data was taken on 1-inch diameter discs, 0.1 inch thick, tested in a field of 3000 oersteds. The alloy from which these discs were punched had a nominal composition of 3.2 silicon, 0.05 carbon, the remainder substantially all iron with minor amounts of nitrogen, sulfur, etc.

Peak ratios _____ 0.8 to 0.9
Maximum torques _____ergs/cc.___ 115,000–120,000

The presence of a well-defined cube texture orientation at the hot band stage following a decarburization and annealing heat treatment is further evidenced by the plot of (100) poles shown in FIG. 1 of the drawings. In the figure, the numerals ½ through 8 around the periphery of the figure define regions having the indicated relative frequency of occurrence of cube poles, or cube edge directions. Thus, in the rolling direction, the largest concentration of cube edge directions is contained within the shaded area bounded by the lines 8. Similarly, in the transverse-to-rolling direction, the greatest frequency of cube edge directions occurs within the shaded area defined by the lines 4. The plot on the center of the diagram indicates that a high proportion of the cube faces are parallel to the rolling surface of the metal.

Depending upon the amount of carbon present in the hot rolled band, the decarburizing and annealing treatments may be carried out substantially simultaneously in the same environmental medium wherein the decarburization treatment merges with the annealing treatment which immediately follows it; or a two-step treatment may be employed. By a two-step treatment is meant where at least one decarburizing step is followed by at least one annealing step.

For example, if the carbon content of the hot rolled band does not exceed about 0.03 percent, a one-step treatment would be preferred using dry hydrogen over the temperature range of about 1000° C. to 1350° C., the decarburization being initiated over this range and the annealing being preferably completed between 1100° C. and 1350° C. to insure substantially complete recrystallization.

If the carbon content of the hot rolled band is above about 0.03 percent, e.g., from about 0.04 percent to 0.07 percent, the two-step treatment would preferably be employed. Such a treatment would comprise, for example, decarburizing the band in wet nitrogen at a temperature of about 700° C. to 850° C. one or more times. The hot rolled oxide is pickled from the surface prior to decarburization to remove a sub-surface oxide rich in silicon dioxide so that decarburization will be readily effected. The carbon is removed to a level of about 0.03 to 0.015 percent and the decarburized hot rolled sheet then subjected to a high temperature anneal in dry hydrogen at a temperature within the range of about 1000° C. to 1350° C. for from about 0.1 to 10 hours, for example, heating to 1300° C. at a rate of 100° C. per hour and holding two hours at this temperature. During the high temperature anneal, the hot rolled sheet is further decarburized to a carbon content below about 0.010 percent and preferably below about 0.005 percent, and the alloy recrystallized. The sulfur content is reduced from about 0.02 percent to about 0.005 percent. Thus, starting with a conventionally cast ingot with randomly oriented grains, a hot rolled and annealed product is obtained which on further treatment will develop a strong texture in which the majority of the grains have (100)[001] orientation.

The decarburized, annealed band is then preferably subjected to a series of warm rolling and intermediate recrystallization heat treatments to develop the aforementioned strong cube texture. The annealed band is rolled at a temperature of about 20° C. to 450° C., for example, 200° C., through a reduction of from about 40 percent to 85 percent (preferably 65 to 70 percent) with an intermediate recrystallization heat treatment between reduction steps. Rolling at a temperature of about 200° C. usually results in a sharper texture than does rolling at room ambient temperature, as evidenced by the values of the peak torque. The intermediate heat treatment is usually carried out at about 800° C. to 1150° C. for about 0.1 to 10 hours, for example, one-half hour at 1000° C. in an atmosphere of dry hydrogen. After reaching the desired, final thickness, the sheet receives a final anneal under substantially nonoxidizing conditions at about 800° C. to 1250° C. for a time sufficient to effect development of strong cube texture, for example, one-half hour at 1200° C. in dry hydrogen. The cooling rate is controlled so as to produce material substantially free from internal stresses.

As illustrative of the invention, the following examples are given:

EXAMPLE 1

An ingot was prepared without control of orientation of the cast structure, and consisting principally of equiaxed grains. The composition was 0.06 percent carbon, 3.25 percent silicon, and the remainder essentially iron except for minor impurities. The ingot, which was 4½ inches square and 11 inches long, was sectioned to produce slabs 1-inch thick.

A slab was selected and heated and isothermally rolled at a temperature of about 1050° C. in three passes to form a hot rolled band of 0.09 inch thick corresponding to a total reduction of about 91 percent. All the rolling passes were substantially in one direction. The hot rolled band so produced was then given the following treatments to form a strip of 0.013 thickness.

The hot rolled band was pickled in a solution containing by weight 8 percent HCl and 4 percent HF to remove the hot rolled oxide and then decarburized by five 30-minute passes through a continuous mesh belt furnace in a moist atmosphere of nitrogen at 800° C. with pickling between passes to remove oxide scale of iron and silicon. With this treatmeent, the band was decarburized to a carbon content of about 0.015 percent.

The decarburized hot rolled band after pickling was then subjected to a high temperature anneal at 1300° C. in dry hydrogen (dew point less than about −60° F.) for two hours, heating at a rate of 100° C. per hour, during which time the band was further decarburized to about 0.002 percent carbon and recrystallized. As a check on the texture of the annealed band, several 1-inch discs were punched from various portions of the sheet, annealed for one-half hour at 1200° C. in dry hydrogen at heating and cooling rates of 100° C. per hour in order to remove the edge strains and then subjected to magnetic torque tests. The results of the measurement are as follows:

TABLE III

| Hot Rolled Annealed Discs (0.09") | Maximum Torque, H—3,000 Oersteds (Ergs/cc.) | Peak Ratio |
|---|---|---|
| 1A | 34,000 | .67 |
| 2A | 57,500 | .67 |
| 3A | 92,000 | .58 |

The foregoing test results indicate the absence of a strong cube texture at this intermediate stage of the processing when the hot reduction amounts to not more than 90 percent.

The annealed hot rolled band was then warm rolled at about 200° C. from 0.09 inch to 0.035 inch, a reduction in thickness of about 60 percent. This rolled strip was then subjected to a recrystallization heat treatment consisting of one-half hour at 1000° C. in dry hydrogen and then further warm rolled at 200° C. to a thickness of 0.013 inch.

Several 1-inch discs were punched from various areas of the sheet for torque tests. The discs were annealed for one-half hour at 1200° C. in dry hydrogen, after which the following torque measurements were obtained:

TABLE IV

| Discs (0.013") | Maximum Torque, H—1,000 Oersteds (Ergs/cc.) | Peak Ratio |
|---|---|---|
| 1B | 90,000 | 1.00 |
| 2B | 98,700 | 0.97 |
| 3B | 94,000 | 1.00 |
| 4B | 92,300 | 0.91 |
| 5B | 115,800 | 0.94 |
| 6B | 106,500 | 0.97 |

The foregoing results indicate the strong cube texture which is obtainable by the method of the invention. These results compare favorably with results shown below obtained on an alloy of similar composition produced from specially prepared oriented ingots processed along the lines described in copending application Serial No. 610,909.

TABLE V

| Maximum Torque, H—1,000 Oersteds (Ergs/cc.) | Peak Ratio |
|---|---|
| 104,000 | 0.76 to 0.90 |

Good cube texture orientation was also obtained from a mill ingot of about 19 inches in thickness having an initial composition of 3.05 silicon, 0.047 carbon, 0.018 sulfur, 0.065 manganese and the remainder substantially all iron. The mill ingot was hot rolled to an intermediate thickness of about 0.100 inch at temperatures within the range of from about 900° C. to 1350° C., decarburized at 800° C. to lower the carbon content to about 0.015. Following decarburization, the hot rolled band was annealed in dry hydrogen by heating to 1100° C. at a rate of 100° C. per hour. Thereafter, it was held at 1100° C. for four hours, at 1125° C. for an additional four hours and within the range from about 1200° C. to 1300° C. for another four hours. At this stage, the carbon had been reduced to about 0.002 and the sulfur to 0.004. The decarburized and annealed hot band was then rolled at 200° C. to a final thickness of about 0.013 inch in two stages with an intermediate heat treatment of 30 minutes at 1000° C. in hydrogen at 0.035 inch thickness and given a final anneal in a dry hydrogen atmosphere at 1200° C. for 30 minutes. Several torque discs were made from the final strip and found to have an average torque ratio of 0.91 and average maximum torques of about 110,500 ergs/cc. The A.-C. loss at 60 cycles and 15,000 gauss is 0.68 watt per pound in the rolling direction and 0.79 watt pound in the transverse direction. The A.-C. losses were also determined on additional strips which had been annealed and then cooled in a magnetic field of 700 oersteds from the Curie temperature to room temperature, both parallel to and transverse to the rolling directions. In the piece annealed with the field parallel the rolling direction, a loss of 0.53 watt per pound was present parallel to the rolling direction and a loss of 0.85 watt per pound in the transverse-to-rolling direction. In the sample annealed with the field applied transverse to the rolling direction, the losses in watts per pound were 0.74 and 0.58, respectively, when measured parallel and transverse to the rolling directions.

To further indicate the magnetic properties of the material, additional samples were measured for their D.-C. charactersics. In this instance, separate samples were annealed and cooled (1) in the absence of a magnetic field, (2) in the presence of a magnetic field of 700 oersteds applied parallel to the rolling direction, and (3) in the presence of a magnetic field of 700 oersteds applied transverse to the rolling direction. The induction B, at 2 oersteds, coercive force $H_c$, and maximum permeability $\mu_{max}$ were measured parallel and transverse the rolling direction. These results are set forth below:

| | No Magnetic Anneal | | Magnetic Anneal in Roll. Dir. | | Magnetic Anneal in Trans. Dir. | |
|---|---|---|---|---|---|---|
| | Roll. Dir. | Trans. Dir. | Roll. Dir. | Trans. Dir. | Trans. Dir. | Trans. Dir. |
| B | 15,200 | 14,600 | 16,800 | 15,700 | 16,900 | 16,000 |
| $H_c$ | .07 | .09 | .085 | .13 | .10 | .07 |
| $\mu_{max}$ | 75,000 | 37,500 | 110,000 | 21,000 | 33,500 | 72,500 |

EXAMPLE 2

The importance of controlling the variables in achieving the results of the invention will be better appreciated by Examples 2 to 4, which are as follows:

As has been stated hereinbefore, unless the major portion of the hot rolling reduction of the slab is conducted over a temperature range at which the material is constituted at least in part of the austenitic or gamma phase, for example, above 900° C., a strong cube texture is not favored in subsequent treatments. This is shown by the following, wherein one slab (1C) was hot rolled isothermally at 1050° C. to form a hot rolled band which was thereafter treated in accordance with the procedure of Example 1 to produce 0.013 inch sheet. Another slab (2C) was hot rolled so that the temperature, before a major portion of the reduction had been completed, varied from 1050° C. to 600° C. The hot rolled band formed by this treatment was likewise processed as in Example 1 to form a 0.013 inch sheet. Samples of both sheets were tested magnetically and gave the following results:

TABLE VI

| Discs (0.013") | Hot rolling Temperature, °C. | Maximum Torque, H—1,000 Oersteds (Ergs/cc.) | Peak Ratio |
|---|---|---|---|
| 1C | 1,050 | 99,600 | 0.96 |
| 2C | 1,050-600 | 63,000 | 0.9 |

The foregoing shows the adverse effect that hot rolling at temperatures below 900° C. have on cube texture of the final product.

EXAMPLE 3

This example shows the importance of removing carbon after completion of hot rolling. Three hot rolled band samples were decarburized and annealed to different carbon levels, the bands then processed to strips of 0.013 inch thick in accordance with the procedure outlined in Example 1. Discs were punched from the final product, annealed, and then subjected to the torque magnetometer test.

TABLE VII

| Specimen | Percent Carbon | Maximum Torque, H—1,000 Oersteds (Ergs/cc.) | Peak Ratio |
|---|---|---|---|
| 1D | 0.014 | 84,000 | .75 |
| 2D | 0.005 | 87,000 | .82 |
| 3D | 0.001 | 103,000 | .94 |

The results show the importance of obtaining a low carbon content prior to the cold rolling reduction. A carbon content below 0.010 percent, and preferably below 0.005 percent, is required.

It is thus apparent from the foregoing that unless the variables with respect to the hot rolling temperature, the decarburizing treatment and the high temperature anneal are carefully controlled, a poorer cube texture will result. Even when these necessary precautions are taken, the finishing operations must be carefully executed so that the cube texture does not deteriorate.

EXAMPLE 4

This example illustrates the desirability of warm rolling when reducing the hot rolled band to final thickness. An 0.1 inch annealed band containing less than 0.002 percent carbon was warm rolled in two stages to 0.012 inch gauge. The band was first warm rolled at 200° C. to 0.035 inch, heat treated at 1000° C. in dry hydrogen for one-half hour, then warm rolled again at 200° C. to 0.012 inch. The final sheet was then annealed as in previous examples at 1200° C. for about one-half hour. The foregoing was repeated on another section of the same hot rolled band except that the rolling was conducted at room temperature. The results are compared as follows:

TABLE VIII

| Rolling Temperature | Maximum Torque, H—1,000 Oersteds (Ergs/cc.) | Peak Ratio |
|---|---|---|
| 200° C. | 103,000 | .94 |
| Room Temp. | 60,000 | .91 |

The foregoing shows the relative advantage of warm rolling in obtaining a high percentage of cube texture orientation.

It will be appreciated that the combination of controls specified hereinbefore are very important if strong cube texture from ingots having randomly oriented grains is to be assured. It has been pointed out that the carbon content plays two important functions, one where a sufficiently high amount should be present at the beginning of the operation in order to insure that some austenite is present during hot rolling and the other where its subsequent removal is a prime necessity if the desired texture is to be obtained after the completion of cold rolling.

The process of the present invention is applicable to the production of cube textured sheet from oriented starting material, although its principal advantage resides in the ability to form oriented sheet from non-oriented starting material, as already described. The major distinction between starting with an oriented and a non-oriented ingot is that the columnar grains of the oriented material must be rolled with their axes aligned in preselected orientations if optimum cube texture is to be obtained. The method for hot rolling of columnar or oriented starting material is described and claimed in the copending Hibbard and Walter application Serial No. 610,909, filed September 20, 1956, and assigned to the same assignee as the present application.

Examples of the processing as applied to the oriented or columnar ingots follows:

EXAMPLE 5

A grain-oriented ingot was produced with columnar grains so oriented that by cutting the ingot in a prescribed way, slab sections could be obtained in which a cube plane of a majority or grains lay in the rolling plane and a cube direction parallel to the rolling direction. The orientation in the ingot was made possible by preparing a substantially pure melt of iron-silicon containing about 0.06 percent carbon, about 3 to 3.25 percent silicon and the remainder essentially iron and casting said melt in a mold having a "seed" plate at the bottom. The seed plate was adapted with heat exchanger means to cause the melt to solidify from the bottom up so as to produce columnar grains in the longitudinal direction of the mold substantially perpendicular to the plane of the seed plate and having the same orientation, the grains having [001] directions in the direction of the columnar axis. The ingot, which was 4½ inches square and 11 inches long, was sectioned to produce slabs 1-inch thick wherein each slab contained columnar grains parallel to its long dimension.

A slab was selected (slab A) and heated to a temperature of 1000° C. while a second slab (slab B) was heated to 1200° C. and a third slab (slab C) was heated to 900° C. These were then rolled in six passes to form a hot rolled band of about 0.1 inch thickness (about 90 percent reduction). Slab A and slab B were rolled without reheating in about 45 seconds. Slab C was reheated to 900° C. between the third and fourth mill passes. The finishing temperature was about 550° C. in all three instances.

Discs one inch in diameter were punched from the hot rolled sheets and ground to a uniform thickness of 0.070 inch. They were then annealed in dry hydrogen at a temperature of 1200° C. for one-half hour, heating from 600° C. at a rate of 100° C. per hour and cooling from 1200° C. at this rate to 600° C. Both prior to this heat treatment and following it, the discs were subjected to magnetic torque test in a field of 2000 oersteds. The averaged results for each condition are as follows:

TABLE IX

Tests Before Heat Treatment

| Slab Designation | Slab Temp., ° C. | Peak Ratio | Max. Torque (Ergs/cc.) |
|---|---|---|---|
| A | 1,000 | .55 | 49,000 |
| B | 1,200 | .27 | 37,000 |
| C | 900 | (data not obtained) | |

TABLE X

Tests Following Heat Treatment

| Slab Designation | Slab Temp., ° C. | Peak Ratio | Max. Torque (Ergs/cc.) |
|---|---|---|---|
| A | 1,000 | .95 | 92,500 |
| B | 1,200 | .77 | 65,200 |
| C | 900 | .66 | 38,500 |

It will be noted from these data that at the hot rolled band stage of fabrication the cube texture is indicated in slab A after annealing. The data also show that a weaker texture, one indeterminate by a torque test, results where the slab temperature (slab B) is of the order of 1200° C. and reheating is not employed, or when the temperature (slab C) is 900° C. and the slab is reheated. These effects are believed to be due to the occurrence of recrystallization during hot working or during reheating.

A fourth slab (slab D) was heated to 1050° C. and rolled without reheating to a hot rolled band of about 0.1 inch thickness. The results obtained were similar to those obtained for slab A, both before and after heat treatment.

The remaining portions of the hot rolled band (from slab D) were pickled in a solution containing by weight 8 percent HCl and 4 percent HF to remove the hot rolled oxide and then decarburized by five 30-minute passes through a continuous mesh belt furnace in a moist atmosphere of nitrogen at 800° C. with pickling between passes to remove oxide scale of iron and silicon. With this treatment, the band was decarburized to a level of about 0.015 percent carbon.

The decarburized hot rolled band after pickling was then subjected to a high temperature anneal at 1300° C. in dry hydrogen (dew point less than about −60° C.) for two hours during which time the band was further decarburized to about 0.002 percent carbon and recrystallized. As a check on the texture of the decarburized and annealed band, several 1-inch discs were punched from various portions of the sheet, annealed for one-half hour at 1200° C. in dry hydrogen at heating and cooling rates of 100° C. per hour in order to remove the edge strains and then subjected to magnetic torque tests. The averaged results of these measurements are as follows:

TABLE XI

| Slab Designation | Percent Carbon | Peak Ratio | 0.1″ Discs, H—3,000 Oersteds Torque (Ergs/cc.) |
|---|---|---|---|
| D | 0.002 | 0.9 | 132,000 |

Note that the data indicate a strong cube texture after decarburization and annealing.

The decarburized and annealed hot rolled band obtained from slab D was then warm rolled at about 200° C. from about 0.1 inch to 0.035 inch, a reduction in thickness of about 60 percent. This rolled sheet was then subjected to a recrystallization heat treatment consisting of one-half hour at 1000° C. in dry hydrogen and then further warm rolled at 200° C. to a thickness of 0.012 inch.

Several 1-inch discs were punched from various areas of the sheet for torque tests. The punched discs were annealed for one-half hour at 1200° C. in dry hydrogen to recrystallize the cold worked structure, after which the following torque measurements were obtained:

TABLE XII

| Discs (0.012″) | Max. Torque, H—1,000 Oersteds (Ergs/cc.) | Peak Ratio |
|---|---|---|
| D1 | 105,000 | 0.89 |
| D2 | 114,000 | 0.90 |
| D3 | 113,000 | 0.85 |
| D4 | 110,000 | 0.88 |

The foregoing results indicate the very strong cube texture which is obtainable in the finished sheet when the hot rolled band is decarburized and annealed before further processing into finished strip.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. In the method of preparing a cube texture soft magnetic sheet metal product from a cast ferrous metal body containing from about 2 percent to 6 percent silicon and characterized by having randomly oriented grains which comprises the steps of hot rolling the body to form a hot rolled band of from about 0.05 to 0.25 inch in thickness, thereafter annealing the resulting hot rolled band in a decarburizing atmosphere at a temperature from about 800 to 1350° C. to remove carbon from said band and to recrystallize and develop cube texture therein.

2. In the method of preparing a cube texture soft magnetic sheet metal product from a cast ferrous metal body containing about 3.2 percent silicon and characterized by having randomly oriented grains which comprises the steps of hot rolling the body to form a hot rolled band, thereafter annealing the resulting hot rolled band in a pure hydrogen atmosphere at a temperature of at least 1000° C. to remove carbon from said band and to recrystallize and develop cube texture therein.

3. A method of preparing a cube texture soft magnetic sheet metal product from a cast ferrous metal body comprised essentially of iron and about 2 percent to 6 percent silicon and containing sufficient carbon to cause said body to be constituted in part of austenite at hot rolling temperatures, which method comprises hot rolling said body to a total reduction of at least about 70 percent, continuing the rolling to form a hot rolled band, decarburizing and annealing said hot rolled band, rolling said treated hot rolled band through at least one reduction stage of about 40 to 85 percent in thickness, with an intermediate recrystallization heat treatment between stages when more than one stage is employed to arrive at the thickness of said sheet metal product, and heating the resulting sheet under substantially nonoxidizing conditions to recrystallize and develop cube texture in said sheet.

4. A method of preparing a cube texture soft magnetic sheet metal product from a cast ferrous metal body comprised essentially of iron and about 2 percent to 6 percent silicon and containing carbon within the range of about 0.02 to 0.1 percent to cause said metal to be constituted in part of austenite at a hot working temperature range above 900° C. which method comprises hot rolling said body to a total reduction of at least about 70 percent, continuing the hot rolling of said metal to form a hot rolled band, decarburizing and annealing said hot rolled band at a temperature of from about 600 to 1350° C., the annealing being carried out at a temperature of from about 1000 to 1350° C. under substantially nonoxidizing conditions, rolling said hot rolled band through at least one reduction stage of about 40 to 85 percent in thickness with an intermediate recrystallization heat treatment between stages when more than one stage is employed to arrive at the thickness of said sheet metal product, and then heating the resulting sheet at a temperature of about 900 to 1350° C. under substantially nonoxidizing conditions to recrystallize and develop cube texture in said sheet.

5. The method of preparing a cube texture soft magnetic sheet metal product from a cast ferrous metal body comprised essentially of iron and about 2 to 6 percent silicon and containing carbon causing said body to be constituted in part of austenite at hot rolling temperatures, which method comprises hot rolling said body to a total reduction of at least about 70 percent, continuing the rolling to form a hot rolled band, subjecting said band to the action of a molten barium chloride bath containing dissolved barium oxide at a temperature of from 950 to 1350° C. to reduce the carbon content of said band, rolling said treated hot rolled band through at at least one reduction stage of about 40 to 85 percent in thickness, with an intermediate recrystallization heat treatment between stages when more than one stage is employed to arrive at the thickness of said sheet metal product and heating the resulting sheet under substantially nonoxidizing conditions to recrystallize and develop cube texture in said sheet.

6. A method of preparing a cube texture soft magnetic sheet metal product from a cast ferrous metal body comprised essentially of iron and about 2 to 6 percent silicon and containing carbon in an amount of about 0.02 percent to 0.1 percent causing said metal to be constituted in part of austenite at a hot working temperature range above 900° C., which method comprises hot rolling said body to a total reduction of at least about 70 percent, continuing said hot rolling of said metal to form a hot rolled band, decarburizing and annealing said hot rolled band at the temperatures of from about 600 to 1350° C., the annealing being carried out at a temperature of from about 1000 to 1350° C. under substantially nonoxidizing conditions, subjecting said treated metal product to a series of warm rolling stages and intermediate recrystallization heat treatments to effect reduction in thickness of about 40 to 85 percent between said intermediate heat treatments until the desired final thickness has been obtained, said warm rolling being conducted at temperatures of about 50 to 450° C. and the intermediate heat treatment between rolling stages at about 800 to 1150° C. under substantially nonoxidizing conditions, and then heating the final rolled sheet at a temperature of about 900 to 1350° C. under substantially nonoxidizing conditions for a time sufficient to recrystallize and develop cube texture in said sheet.

7. A method of preparing a cube texture soft magnetic sheet metal product from a cast ferrous metal body comprised essentially of iron and about 2 to 6 percent silicon and containing about 0.02 to 0.1 percent carbon causing said metal to be constituted in part of austenite at a hot working temperature range above 900° C., which comprises heating said cast metal body to a temperature within the range of about 1000 to 1250° C., hot rolling said body to a total reduction of at least about 70 percent while said body is constituted in part of austenite over a major portion of the reduction, continuing said hot rolling of said body to form a hot rolled band, subjecting said band to the action of a decarburizing medium at a temperature of about 600 to 900° C. to reduce substantially the carbon content, annealing and further decarburizing said treated hot rolled band at a temperature of from about 1000 to 1350° C. in a substantially nonoxidizing medium, subjecting said treated band to a series of rolling stages and intermediate recrystallization heat treatments to effect reduction in thickness of about 40 to 85 percent between heat treatments, the intermediate heat treatment between rolling stages being effected at temperatures of from about 800 to 1150° C. under substantially nonoxidizing conditions, and then annealing the final rolled sheet at a temperature of about 900 to 1350° C. in a substantially nonoxidizing medium for a time sufficient to recrystallize and develop cube texture in said sheet.

8. A method of preparing a cube texture soft magnetic sheet metal product from a cast ferrous metal body comprised essentially of iron and about 2.5 percent to 5 percent silicon and containing carbon in an amount of about 0.04 percent to 0.07 percent causing said body to be constituted in part of austenite at elevated working temperatures, which comprises hot rolling said body to a total reduction of at least about 70 percent while said body is constituted in part of austenite over a major portion of the reduction and continuing the rolling to form a hot rolled band, decarburizing and annealing said hot rolled band, rolling said treated hot rolled band through at least one reduction stage of about 40 to 85 percent, with an intermediate recrystallization heat treatment between stages when more than one stage is employed to arrive at the thickness of said sheet metal product and heating the resulting sheet under substantially nonoxidizing conditions to recrystallize and develop cube texture in said sheet.

9. A method of preparing a cube texture soft magnetic sheet metal product from a cast ferrous metal body comprised essentially of iron and about 2.5 to 5 percent silicon and containing carbon within the range of about 0.04 to 0.07 percent causing said metal to be constituted in part of austenite at a hot working temperature range above 900° C., which comprises hot rolling said body to a total reduction of at least about 70 percent while said metal body is constituted in part of austenite over a major portion of the reduction and continuing the hot rolling of said metal to form a hot rolled band, decarburizing and annealing said hot rolled band at a temperature of from about 600 to 1350° C., the annealing being carried out at a temperature of from about 1000 to 1350° C. under substantially nonoxidizing conditions, rolling said hot rolled band through at least one reduction stage of about 40 to 85 percent with an intermediate recrystallization heat treatment between stages when more than one stage is employed to arrive at the thickness of said sheet metal product, and then heating the resulting sheet at a temperature of about 900 to 1350° C. under substantially nonoxidizing conditions to recrystallize and develop cube texture in said sheet.

10. A method of preparing a cube texture soft magnetic sheet metal product from a cast ferrous metal body comprised essentially of iron and about 2.5 to 5 percent silicon and containing carbon in amount of about 0.04 to 0.07 percent whereby said metal is constituted in part of austenite at a hot working temperature range above 900° C., which method comprises hot rolling said body to a total reduction of at least about 70 percent while said body is constituted in part of austenite over a major portion of the reduction and continuing said hot rolling of said metal to form a hot rolled band, decarburizing and annealing said hot rolled band at a temperature range of from about 600 to 1350° C., the annealing being carried out at a temperature of about 1000 to 1350° C. under substantially nonoxidizing conditions, subjecting said treated metal product to a series of rolling stages and intermediate recrystallization heat treatments to effect reduction in thickness of about 40 to 85 percent between said intermediate heat treatments until the desired final thickness has been obtained, said intermediate heat treatment being conducted at temperatures between rolling stages at about 800 to 1150° C. under substantially nonoxidizing conditions, and then heating the final rolled sheet at a temperature of about 900 to 1350° C. under substantially nonoxidizing conditions for a time sufficient to recrystallize and develop cube texture in said sheet.

11. A method of preparing a cube texture soft magnetic sheet metal product from a cast ferrous metal body comprised essentially of iron and about 2.5 to 5 percent silicon and containing about 0.04 to 0.07 percent carbon causing said metal to be constituted in part of austenite at a hot working temperature range above 900° C., which comprises heating said cast metal body to a temperature within the range of about 1000 to 1250° C., hot rolling said body to a total reduction of at least about 70 percent while said body is constituted in part of austenite over a major portion of the reduction and continuing said hot rolling of said body to form a hot rolled band having an oxide coating, removing the hot rolled oxide from said band, subjecting said band to the action of a decarburizing medium at a temperature of about 600 to 900° C. for a time sufficient to lower the carbon content to below 0.03 percent, annealing and further decarburizing said treated hot rolled band at a temperature of from about 1000 to 1350° C. in a substantially nonoxidizing medium having an avidity for carbon, subjecting said treated band to a series of rolling stages and intermediate recrystalization heat treatments to effect reduction in thickness of about 40 to 85 percent between heat treatments, the intermediate heat treatment being conducted at temperatures of about 800 to 1150° C. between rolling stages under substantially nonoxidizing conditions, and then annealing the final rolled sheet at a temperature of about 900 to 1350° C. in a substantially nonoxidizing medium for a time sufficient to recrystallize and develop cube texture in said sheet.

12. In a process for the production of grain oriented magnetizable strips and sheets of magnetizable iron alloy containing at least 2 percent silicon in which hot rolled strips and sheets are cold rolled and then subjected to a final recrystallization anneal at a temperature from about 900° C. to 1200° C., in combination therewith the step which comprises subjecting the hot rolled strips and sheets to a refining anneal under an oxygen free ambient medium consisting of pure hydrogen at a temperature from about 1000° C. to 1200° C. directly before the cold rolling whereby a marked (100) [001] texture is obtained in the strips and sheets during the final recrystallization anneal.

13. The method of preparing a soft magnetic sheet metal product having a marked (100)[001] grain texture from a cast ferrous metal body containing at least two percent silicon, said method comprising hot rolling the cast body to form a hot rolled sheet, and thereafter subjecting the hot rolled sheet to a refining anneal under an oxygen free ambient atmosphere consisting of pure hydrogen at a temperature of from about 1000° C. to 1350° C. to obtain a marked (100)[001] texture in the hot rolled sheet.

14. The method of preparing cube texture soft magnetic sheet from a cast ferrous metal body consisting of 2 to 6 weight percent silicon, from about 0.02 to 0.10 weight percent carbon, balance substantially all iron except for incidental impurities, which method comprises hot rolling the body to at least a 70 percent reduction in thickness at a temperature no lower than about 900° C. and decarburizing and annealing the hot rolled body at a temperature of from about 600 to 1350° C. for a time sufficient to develop (100)[001] crystallographic orientation therein.

15. A process as defined in claim 14 wherein the decarburized and annealed body is rolled to a final thickness in the range of 50 to 450° C. and then given a final anneal in a non-oxidizing atmosphere at a temperature of about 900° C. to 1350° C.

References Cited in the file of this patent

UNITED STATES PATENTS 2,535,420    Jackson _____ Dec. 26, 1950

FOREIGN PATENTS 1,009,214    Germany _____ May 29, 1957